US012668069B2

(12) United States Patent
Chen et al.

(10) Patent No.: US 12,668,069 B2
(45) Date of Patent: Jun. 30, 2026

(54) OLED PRINT HEAD

(71) Applicant: Avision Inc., Hsinchu (TW)

(72) Inventors: Yen-Cheng Chen, Hsinchu (TW); Chin-Hung Wang, Hsinchu (TW)

(73) Assignee: AVISION INC., Hsinchu (TW)

( * ) Notice: Subject to any disclaimer, the term of this patent is extended or adjusted under 35 U.S.C. 154(b) by 127 days.

(21) Appl. No.: 18/937,429

(22) Filed: Nov. 5, 2024

(65) Prior Publication Data

US 2025/0332847 A1 Oct. 30, 2025

(30) Foreign Application Priority Data

Apr. 29, 2024 (TW) ................................ 113116056

(51) Int. Cl.
*B41J 2/45* (2006.01)
*B41J 2/47* (2006.01)
*H05B 45/30* (2020.01)

(52) U.S. Cl.
CPC . *B41J 2/47* (2013.01); *B41J 2/45* (2013.01); *H05B 45/30* (2020.01)

(58) Field of Classification Search
CPC .... B41J 2/45; B41J 2/47; H05B 45/14; H05B 45/30; H05B 45/40; H05B 45/60; H05B 47/155; G09G 3/3233; Y02B 20/30
See application file for complete search history.

(56) References Cited

U.S. PATENT DOCUMENTS 6,022,155 A * 2/2000 Nakajima .................. B41J 2/45 400/118.2
2009/0243512 A1* 10/2009 Nagumo .............. G03G 15/326 327/108
2015/0266310 A1* 9/2015 Watanabe ................ B41J 2/451 347/247

* cited by examiner

*Primary Examiner* — Anh T Vo
(74) *Attorney, Agent, or Firm* — McClure, Qualey & Rodack, LLP

(57) ABSTRACT

An OLED print head includes a control unit and a plurality of lighting units. The control unit is configured to output a start signal and a brightness signal. Each lighting unit includes a shift register, a driving circuit and an OLED. These shift registers are connected in series so that a shift output terminal of a previous stage's shift register is coupled to a shift input terminal of a subsequent stage's shift register. An actuation output terminal of each shift register outputs an actuation output signal, and the actuation output signal has an actuation pulse wave corresponding to a time point of a trigger pulse wave. The driving circuit is configured to store a brightness voltage corresponding to the brightness signal in a driving capacitor in response to the trigger pulse wave of a scanning signal.

16 Claims, 9 Drawing Sheets

OLED PRINT HEAD

CROSS-REFERENCE TO RELATED APPLICATION

This non-provisional application claims priority under 35 U.S.C. § 119(a) to Patent Application No. 113116056 filed in Taiwan, R.O.C. on Apr. 29, 2024, the entire contents of which are hereby incorporated by reference.

BACKGROUND

Technical Field

Provided is an OLED print head, and in particular, to an OLED print head having a lighting unit made of a thin film transistor (TFT) and an OLED.

Related Art

LED print heads (LPH) involve the lighting technology of print heads, in which a plurality of lighting modules are manufactured by using a gallium arsenide semiconductor process, and each lighting module has several lighting elements and a driving circuit therefor. Each lighting module is a die. The lighting modules are secured and arranged on a printed circuit board by using a die bonding technology. Therefore, complex procedures such as wafer cutting and die bonding are needed to manufacture the print heads.

SUMMARY

In view of the above, in some embodiments, an OLED print head includes a control unit and a plurality of lighting units. The control unit is configured to output a start signal and a brightness signal. The plurality of lighting units are coupled to the control unit, and each lighting unit includes a shift register, a driving circuit, and an OLED. Each shift register includes a shift input terminal, an actuation output terminal, and a shift output terminal. These shift registers are connected in series so that a shift output terminal of a previous stage's shift register is coupled to a shift input terminal of a subsequent stage's shift register. A shift input terminal of a first stage's shift register receives and shifts the start signal, so as to output a scanning signal having a trigger pulse wave through the shift output terminal. The other shift registers each receives and shifts the scanning signal outputted by the shift output terminal of the previous stage's shift register, so as to output the scanning signal having the trigger pulse wave through the shift output terminal, the actuation output terminal of each shift register outputs an actuation output signal, and the actuation output signal has an actuation pulse wave corresponding to a time point of the trigger pulse wave. The driving circuit includes a driving capacitor, a first switch, and a second switch, and is configured to store a brightness voltage corresponding to the brightness signal in the driving capacitor in response to the trigger pulse wave of the scanning signal. The first switch is controlled by the brightness voltage, and the second switch is controlled by the actuation output signal. The OLED is coupled to the first switch. The first switch and the second switch are located on a driving path of the OLED. An upstream end of the driving path has a working voltage. When both a first switch and a second switch are turned on, the OLED obtains a driving current related to the brightness voltage through the driving path.

In some embodiments, an OLED print head includes a control unit and a plurality of lighting units. The control unit is configured to output a plurality of scanning signals, an actuation signal, and a brightness signal. These scanning signals each has a non-synchronous trigger pulse wave. The lighting units are coupled to the control unit. Each lighting unit includes a synchronization circuit, a driving circuit, and an OLED. Each synchronization circuit includes a synchronous signal input terminal, an actuation input terminal, and an actuation output terminal. The synchronous signal input terminals of these synchronization circuits respectively receive these scanning signals in a one-to-one manner. Signal input terminals of these synchronization circuits receive the actuation signal. The actuation output terminal of each synchronization circuit outputs an actuation output signal according to the trigger pulse wave, so that the actuation output signal has an actuation pulse wave corresponding to a time point of the trigger pulse wave. The driving circuit includes a driving capacitor, a first switch, and a second switch. A brightness voltage corresponding to the brightness signal is stored in the driving capacitor in response to the trigger pulse wave of the scanning signal. The first switch is controlled by the brightness voltage, and the second switch is controlled by the actuation output signal. The OLED is coupled to the first switch, and the first switch and the second switch are located on a driving path of the OLED. An upstream end of the driving path has a working voltage. When both a first switch and a second switch are turned on, the OLED obtains a driving current related to the brightness voltage through the driving path.

To sum up, according to the OLED print head of some embodiments of the present invention, by directly manufacturing the lighting unit formed of a conductive TFT, an OLED, and a driving circuit on a substrate, the manufacturing steps can be simplified. In another aspect, the driving capacitor of the lighting unit stores a brightness voltage corresponding to the brightness signal, so that the voltage is not discharged to a low potential, thereby guaranteeing that a charging or discharging voltage change of the capacitor does not fluctuate excessively large, accelerating a response time for lighting of the lighting unit (under a brightness signal having a relatively short period of time, the lighting unit may quickly perform successive actions such as lighting and extinguishing), and protecting the element from being damaged to prolong the service life.

The following detailed features and advantages of the present invention are described in detail in the embodiments, the content of which is sufficient to enable those of ordinary skill in the art to understand the technical content of the present invention and to implement the technical content, and according to the content disclosed in this specification, the scope of the present application and the drawings, those of ordinary skill in the art can easily understand the relevant purposes and advantages of the present invention.

DETAILED DESCRIPTION

Figure 1:
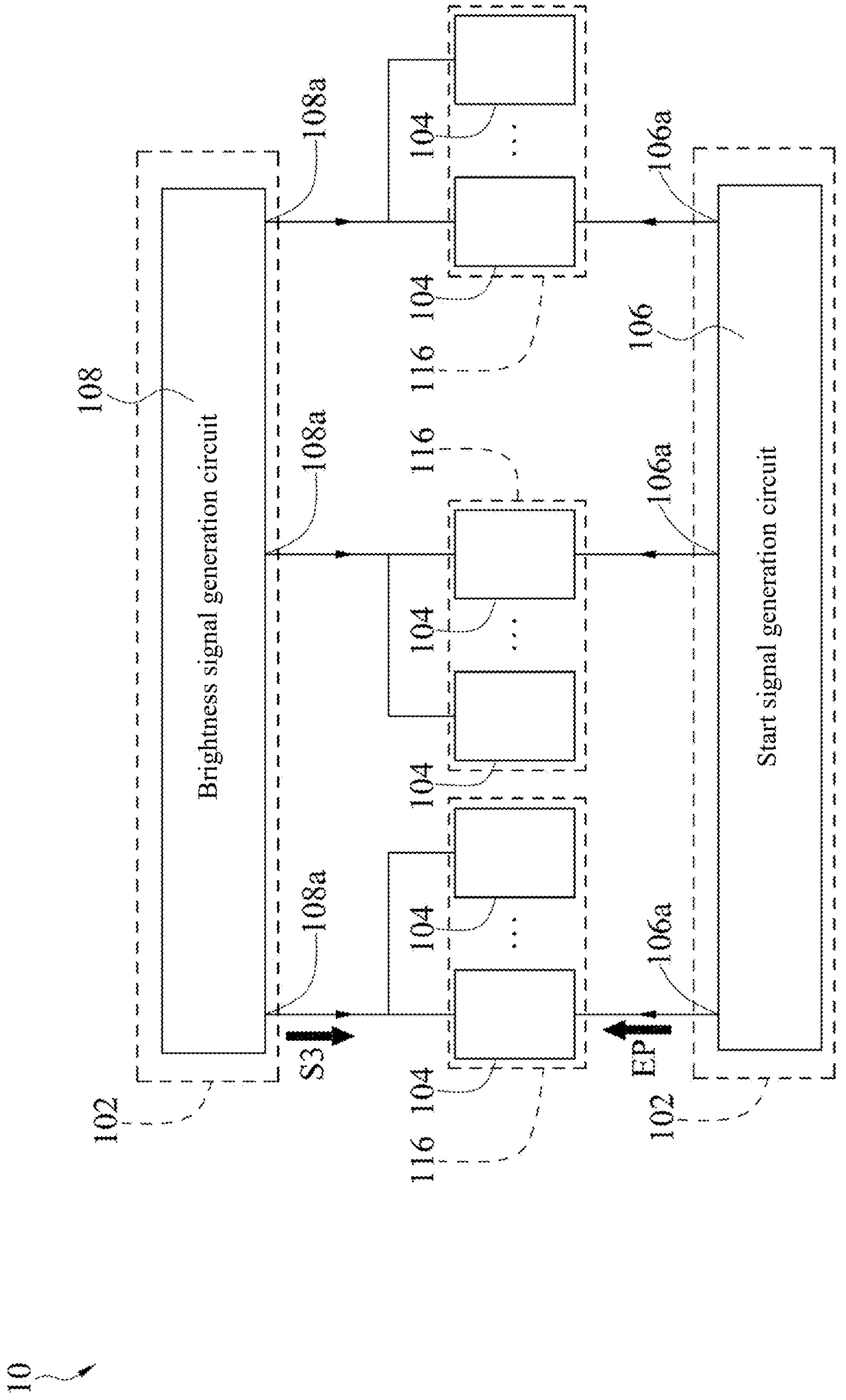
FIG. 1 is a feed line diagram of a lighting unit and illustrates a connection relationship between a control unit and the lighting unit according to a first embodiment of the present invention.
Figure 2:
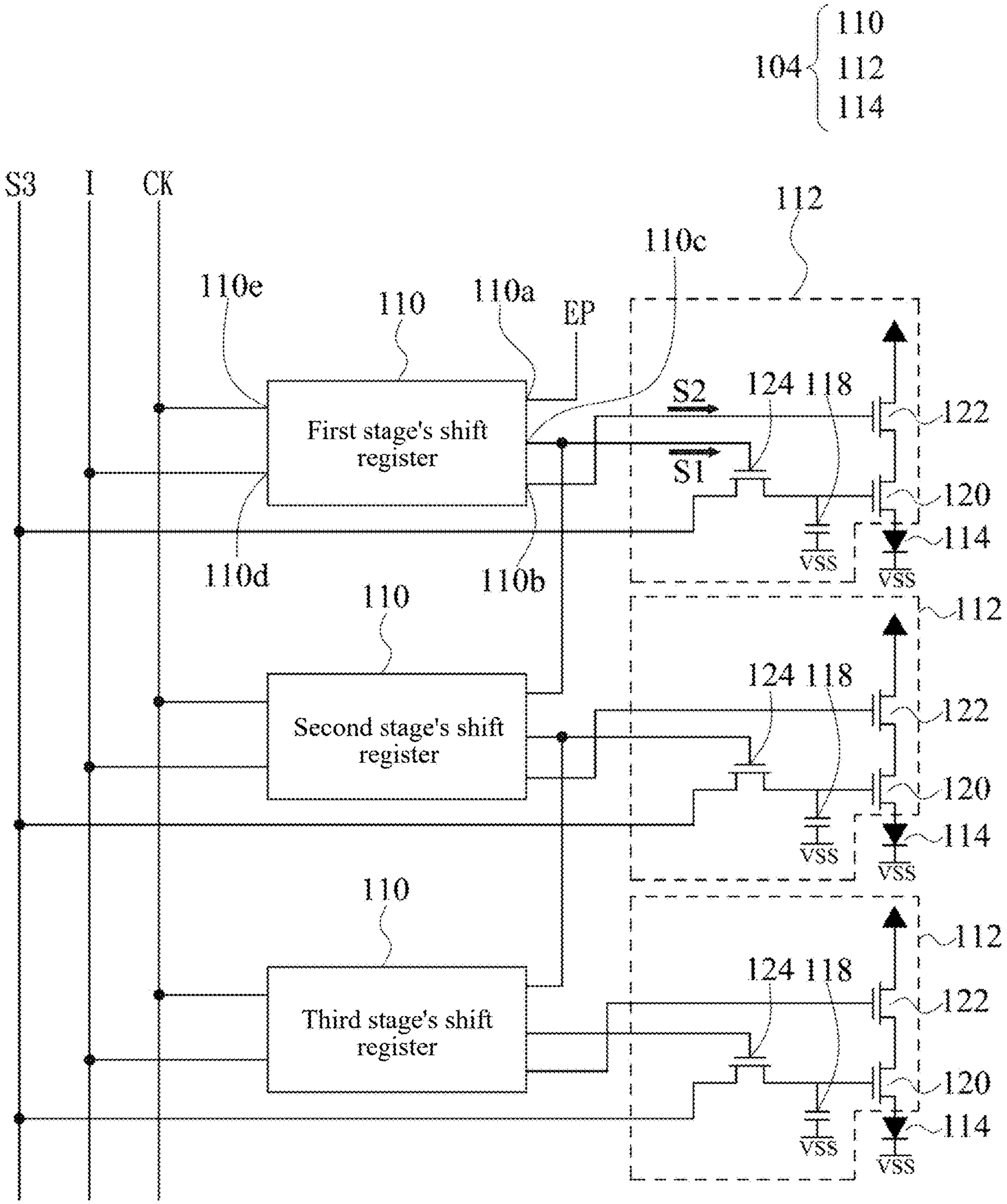
FIG. 2 is a partial feed line diagram of a plurality of lighting units according to the first embodiment of the present invention.

Refer to both FIG. 1 and FIG. 2. FIG. 1 is a feed line diagram of a lighting unit 104 and illustrates a connection relationship between a control unit 102 and the lighting unit 104 according to a first embodiment of the present invention. FIG. 2 is a partial feed line diagram of a plurality of lighting units 104 according to the first embodiment of the present invention. As shown in FIG. 1 and FIG. 2, an OLED print head 10 includes the control unit 102 and the plurality of lighting units 104. The lighting units 104 are coupled to the control unit 102. The lighting units 104 each includes a lighting element manufactured by using a conductive thin film technology and a driving circuit therefor, and therefore the lighting units 104 may be formed on a substrate (referring to a substrate 140 in FIG. 9) according to a predetermined distribution manner. The control unit 102 is configured to output a clock signal CK, an actuation signal I, a start signal EP, and a brightness signal S3. In some embodiments, these lighting units 104 are classified into a plurality of groups 116. Each group 116 includes a plurality of lighting units 104. The partial feed line diagram of the plurality of lighting units 104 shown in FIG. 2 is a partial feed line diagram of lighting units 104 in a same group 116.

In some embodiments, the control unit 102 includes a start signal generation circuit 106 and a brightness signal generation circuit 108. The start signal generation circuit 106 is configured to output a start signal EP. The start signal generation circuit 106 is coupled to the lighting units 104, so as to input the start signal EP to the first lighting unit 104 of each group 116. The brightness signal generation circuit 108 is configured to output a brightness signal S3 to the lighting units 104, so as to control lighting brightnesses of the lighting units 104. It may be understood that the control unit 102 further includes other signal generation circuits respectively outputting a clock signal CK and an actuation signal I, which are not shown in FIG. 1 to prevent the drawings from being excessively complex.

As shown in FIG. 2, each lighting unit 104 includes a shift register 110, a driving circuit 112, and an OLED 114. In some embodiments, each shift register 110 includes a shift input terminal 110*a*, an actuation output terminal 110*b*, a shift output terminal 110*c*, an actuation input terminal 110*d*, and a clock receiving terminal 110*e*. The clock receiving terminal 110*e* receives the clock signal CK outputted by the control unit 102, so that each shift register 110 operates according to the clock signal CK. These shift registers 110 are connected in series so that a shift output terminal 110*c* of a previous stage's shift register 110 is coupled to a shift input terminal 110*a* of a subsequent stage's shift register 110. The shift output terminal 110*c* is configured to output a scanning signal S1, which is a result of shifting the signal received by the shift input terminal 110*a*. Specifically, a first stage's shift register 110 receives the start signal EP through the shift input terminal 110*a*, and outputs the scanning signal S1 through the shift output terminal 110*c* after shifting the start signal EP. The other shift registers 110 each receives, through the shift input terminal 110*a*, the scanning signal S1 outputted by the shift output terminal 110*c* of the previous stage's shift register 110, shifts the received scanning signal S1, and outputs the shifted scanning signal S1 through the shift output terminal 110*c*. The actuation input terminal 110*d* receives the actuation signal I outputted by the control unit 102. In response to the actuation signal I, the actuation output terminal 110*b* of the shift register 110 outputs an actuation output signal S2.

As shown in FIG. 1, in some embodiments, each group 116 includes an identical quantity of lighting units 104. In an example, there are 128 lighting units 104, but the present invention is not limited thereto, and for example, the number may be 64, 256, or the like. Here, serial numbers of the lighting units 104 in these groups 116 are not limited to starting from a same side. In other words, the serial numbers may start from one side of the lighting units 104, or may start from the other side of the lighting units 104. For example, the start signal generation circuit 106 is coupled to the first lighting units 104 on the left side of some groups 116 and the first lighting units 104 on the right side of some groups 116.

The start signal generation circuit 106 includes a plurality of start signal output terminals 106*a*. These start signal output terminals 106*a* are configured to output start signals EP. These start signal output terminals 106*a* are coupled to these groups 116 in a one-to-one manner, and each start signal output terminal 106*a* is coupled to a first stage's shift register 110 in a same group 116. Therefore, when the start signals EP of the start signal output terminals 106*a* are synchronous, the first stage's shift register 110 in the groups 116 actuates in response to the start signals EP at a same time point, and continue to actuates subsequent stage's shift registers 110 in an order.

The brightness signal generation circuit 108 includes a plurality of brightness signal output terminals 108*a*. These brightness signal output terminals 108*a* are configured to output brightness signals S3. These brightness signal output terminals 108*a* are coupled to these groups 116 in a one-to-one manner, and each brightness signal output terminal 108*a* is coupled to all lighting units 104 in a same group 116. Therefore, all of the lighting units 104 in the same group 116 may receive the same brightness signal S3. A lighting unit 104 in each group 116 is designated at a time point by using a scanning signal S1, so that only the designated lighting unit 104 performs an action corresponding to the brightness signal S3 at the time point. In another aspect, the lighting units 104 that are not designated do not perform the action corresponding to the brightness signal S3. In addition, the brightness signal S3 outputted by each brightness signal output terminal 108*a* is independent of each other and therefore is not affected by each other. Therefore, the designated lighting unit 104 in each group 116 may be controlled according to requirements.

In some embodiments, if a resolution of the OLED print head 10 is to reach 600 dots per inch (DPI), approximately 5120 lighting units 104 are needed. Based on that each group 116 has 128 lighting units 104 described above, 40 groups 116 are needed. It should be noted that the number of signal lines for the control unit 102 to output actuation signals I and clock signals CK is 40. The number of signal lines (which may refer to the brightness signal output terminals 108*a*) for the control unit 102 to output brightness signals S3 is 40. Therefore, the brightness signals S3 are serialization data, and 128 signals are needed to respectively instruct the corresponding 128 lighting units 104 to perform actions.

In some embodiments, like the brightness signal generation circuit 108, the other signal generation circuits for respectively outputting the clock signals CK and the actuation signals I each has a plurality of signal output terminals. In addition, the signal output terminals are coupled to the groups 116 in a one-to-one manner, and each signal output terminal is coupled to all lighting units 104 in a same group 116. In this way, each lighting unit 104 in each group 116 receives a same clock signal CK and a same actuation signal I. In some embodiments, the signal output terminals for outputting the clock signals CK output synchronous clock signals CK, so that clock signals CK received by different groups 116 are the same; the signal output terminals for outputting the actuation signals I output a synchronous actuation signal, but actuation signals I received by different groups 116 may be the same or different (depending on lighting occasions of the lighting units 104).

In some embodiments, a signal generation circuit for outputting a clock signal CK has a single signal output terminal, and is coupled to all of the lighting units 104, so as to provide a synchronous clock signal CK to each lighting unit 104. In some embodiments, a signal generation circuit for outputting an actuation signal I has a single signal output terminal, and is coupled to all of the lighting units 104, so as to provide a synchronous actuation signal I to each lighting unit 104.

Figure 3:
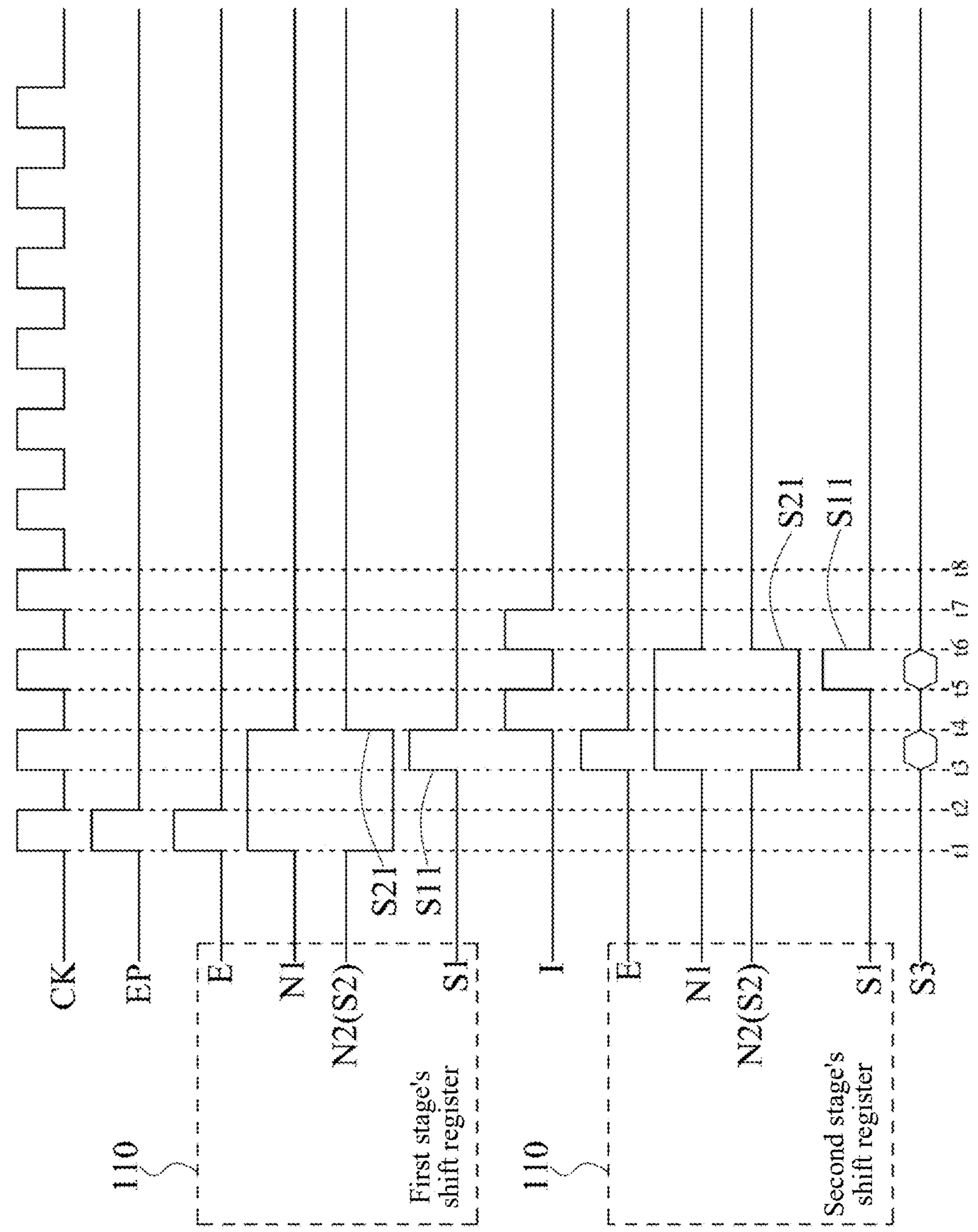
FIG. 3 is a signal timing diagram of an OLED print head according to the first embodiment of the present invention.

Refer to both FIG. 2 and FIG. 3. FIG. 3 is a signal timing diagram of an OLED print head 10 according to the first embodiment of the present invention. After the shift input terminal 110*a* of the first stage's shift register 110 receives a to-be-shifted signal E (here, the to-be-shifted signal E is the start signal EP), in a next cycle of the clock signal CK, a state of the shift input terminal 110*a* is shifted to the shift output terminal 110*c* of the first stage's shift register 110 to be outputted (forming a trigger pulse wave S11 of the scanning signal S1). Similarly, after the shift input terminal 110*a* of the second stage's shift register 110 receives a to-be-shifted signal E (here, the to-be-shifted signal E is the scanning signal S1 of the first stage's shift register 110), in a next cycle of the clock signal CK, a state of the shift input terminal 110*a* is shifted to the shift output terminal 110*c* of the second stage's shift register 110 to be outputted (forming a trigger pulse wave S11 of the scanning signal S1). In this way, pulse waves of the start signal EP are shifted according to the stages of shift registers 110 successively in accordance with a cycle of the clock signal CK. The shift output terminals 110*c* of these shift registers 110 are coupled to corresponding lighting units 104 in a one-to-one manner. Therefore, the lighting units 104 are designated to perform actions in response to the trigger pulse waves S11 corresponding to the scanning signal S1 at different time points. As shown in FIG. 3, the actuation output signal S2 has an actuation pulse wave S21 corresponding to a time point of the trigger pulse wave S11.

Figure 4:
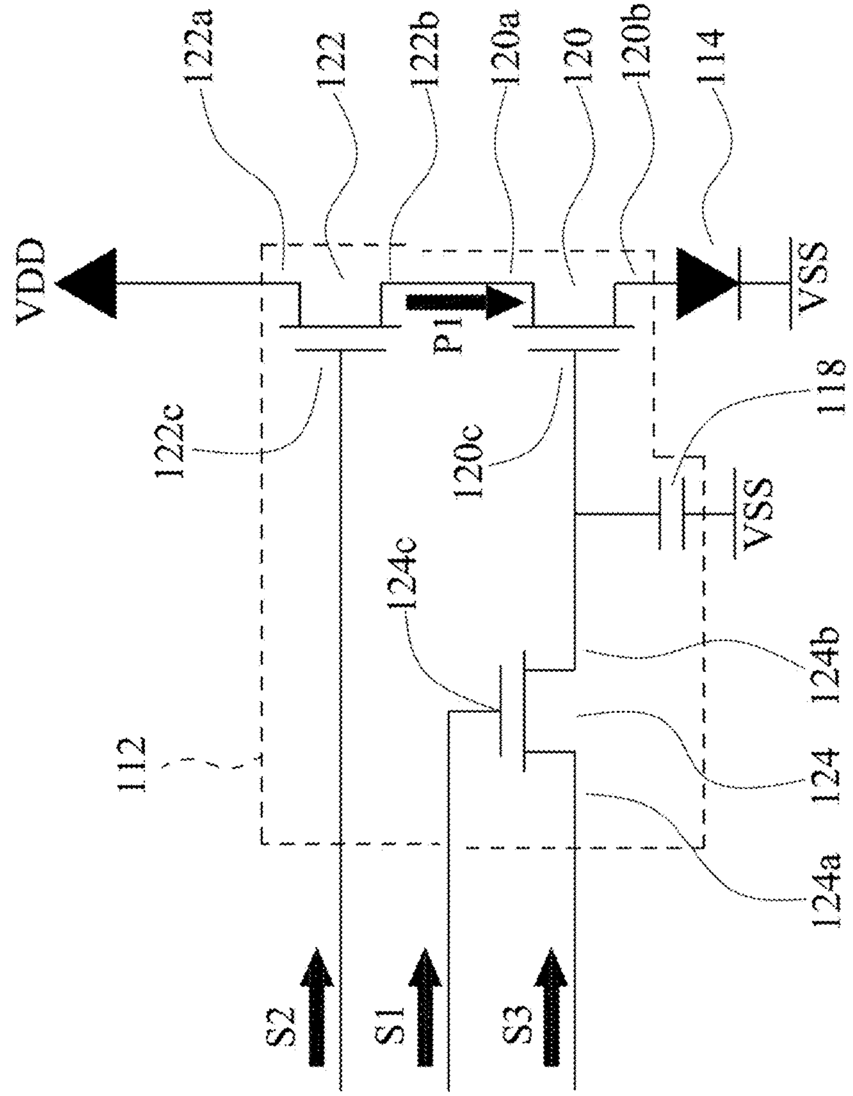
FIG. 4 is a circuit diagram of a driving circuit of a lighting unit according to the first embodiment of the present invention.

FIG. 4 is a circuit diagram of a driving circuit 112 of a lighting unit 104 according to the first embodiment of the present invention. As shown in FIG. 4, the driving circuit 112 includes a driving capacitor 118, a first switch 120, and a second switch 122. The driving circuit 112 is configured to store a brightness voltage corresponding to the brightness signal S3 in the driving capacitor 118 in response to a trigger pulse wave S11 of a scanning signal S1. The first switch 120 is controlled by the brightness voltage, and the second switch 122 is controlled by an actuation pulse wave S21 of the actuation output signal S2. The OLED 114 is coupled to the first switch 120. The first switch 120 and the second switch 122 are located on a driving path P1 of the OLED 114. An upstream end of the driving path P1 has a working voltage VDD. When both the first switch 120 and the second switch 122 are turned on, the OLED 114 obtains a driving current related to the brightness voltage through the driving path P1, for lighting. In this way, each OLED 114 may obtain a corresponding driving current according to the brightness voltage, so as to emit light having a consistent brightness along with a change in the driving current.

As shown in FIG. 4, in some embodiments, the second switch 122, the first switch 120, and the OLED 114 are sequentially coupled along a flowing direction of the driving current. Specifically, the first switch 120 includes a first terminal 120*a*, a second terminal 120*b*, and a control terminal 120*c*. The second switch 122 includes a first terminal 122*a*, a second terminal 122*b*, and a control terminal 122*c*. The first terminal 122*a* of the second switch 122 receives a working voltage VDD. The second terminal 122*b* of the second switch 122 is coupled to the first terminal 120*a* of the first switch 120, the second terminal 120*b* of the first switch 120 is coupled to an anode of the OLED 114, and a cathode of the OLED 114 receives a grounding voltage VSS. The control terminal 120*c* of the first switch 120 is coupled to a driving capacitor 118, so as to be turned on or off in response to a brightness voltage of the driving capacitor 118. The control terminal 122*c* of the second switch 122 receives an actuation output signal S2, so that the second switch 122 is turned on in response to an actuation pulse wave S21 of the actuation output signal S2. Here, the first switch 120 and the second switch 122 are NMOS transistors, the first terminal (120*a*, 122*a*) is a drain, the second terminal (120*b*, 122*b*) is a source, and the control terminal (120*c*, 122*c*) is a gate.

As shown in FIG. 4, in some embodiments, the driving circuit 112 further includes a third switch 124. The third switch 124 includes a first terminal 124*a*, a second terminal 124*b*, and a control terminal 124*c*. The first terminal 124*a* of the third switch 124 receives the brightness signal S3. The second terminal 124*b* of the third switch 124 is coupled to the driving capacitor 118. The control terminal 124*c* of the third switch 124 receives a scanning signal S1. An on/off state of the third switch 124 is decided by a trigger pulse wave S11 of the scanning signal S1. Here, the third switch 124 is an NMOS transistor, the first terminal 124*a* is a drain, the second terminal 124*b* is a source, and the control terminal 124*c* is a gate.

The foregoing transistors (for example, the foregoing switches 120, 122, 124, 126, 128, 130, 132, 134, 136) are thin film transistors (TFT).

Refer to both FIG. 3 and FIG. 4. The third switch 124 is turned on in response to the trigger pulse wave S11 of the scanning signal S1, that is, the first terminal 124*a* of the third switch 124 is conducted to the second terminal 124*b* of the third switch 124, so that the driving capacitor 118 receives the brightness signal S3 through the third switch 124 and is charged to the brightness voltage. In addition, due to processing errors, the characteristics of a transistor in each lighting unit 104 may be inconsistent with the characteristics of the OLED 114, resulting in that lighting brightnesses of the OLEDs 114 of these lighting units 104 are inconsistent. Therefore, a proper brightness voltage value is assigned to each lighting unit 104 by using the brightness signal S3, to adjust the driving current of the corresponding OLED 114, so that each OLED 114 can emit light having a consistent brightness (when lighting is needed). It is to be particularly noted that, according to whether to enable the corresponding OLED 114 to emit light, the brightness signal S3 during the trigger pulse wave S11 is at a high potential (lighting) or at a low potential (not lighting). In addition, a voltage level (that is, a voltage value) of the high potential may be adjusted slightly according to requirements, so as to adjust a requirement on a drain-source current (for example, if the brightness needs to be reduced, the brightness voltage is reduced, so as to reduce the drain-source current; and otherwise, the brightness voltage is increased).

A time length of the trigger pulse wave S11 is adjustable, as long as the driving capacitor 118 can be charged to the brightness voltage. It is to be noted that the time length of the trigger pulse wave S11 depends on a print speed. For example, when the print speed is 600 pages per minute (PPM), a time length of the actuation pulse wave S21 is greater than a time length of the trigger pulse wave S11 at the print speed of 1200 PPM.

Figure 5:
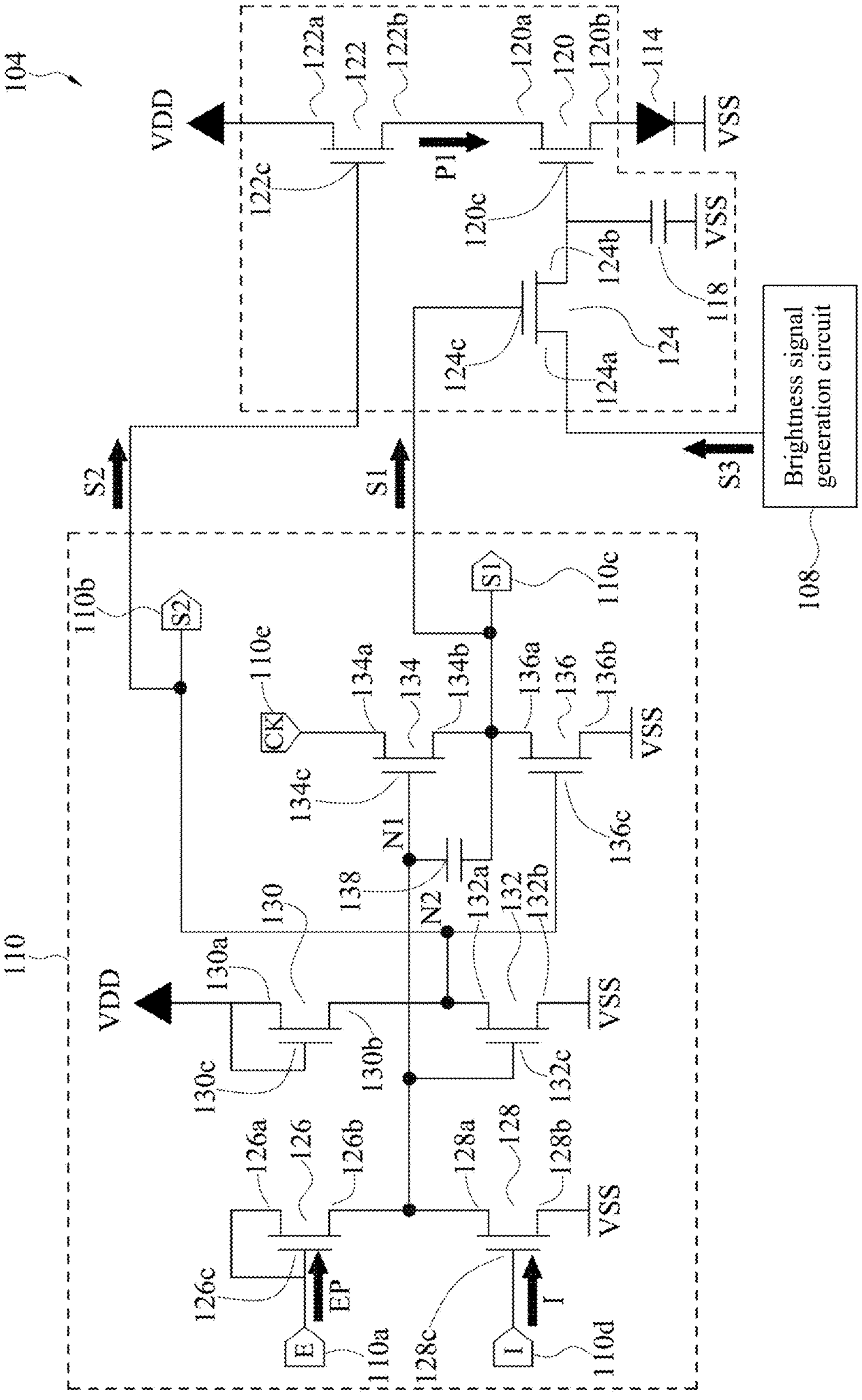
FIG. 5 is a circuit diagram of a shift register according to the first embodiment of the present invention.

Refer to both FIG. 3 and FIG. 5. FIG. 5 is a circuit diagram of a shift register 110 according to the first embodiment of the present invention. As shown in FIG. 5, in some embodiments, each shift register 110 includes a fourth switch 126, a fifth switch 128, a sixth switch 130, a seventh switch 132, an eighth switch 134, a ninth switch 136, and an actuation capacitor 138. The fourth switch 126 has a first terminal 126*a*, a second terminal 126*b*, and a control terminal 126*c*. The fifth switch 128 has a first terminal 128*a*, a second terminal 128*b*, and a control terminal 128*c*. The sixth switch 130 has a first terminal 130*a*, a second terminal 130*b*, and a control terminal 130*c*. The seventh switch 132 has a first terminal 132*a*, a second terminal 132*b*, and a control terminal 132*c*. The eighth switch 134 has a first terminal 134*a*, a second terminal 134*b*, and a control terminal 134*c*. The ninth switch 136 has a first terminal 136*a*, a second terminal 136*b*, and a control terminal 136*c*. Here, the switches (126, 128, 130, 132, 134, 136) of each shift register 110 are NMOS transistors, the first terminal (126*a*, 128*a*, 130*a*, 132*a*, 134*a*, 136*a*) is a drain, the second terminal (126*b*, 128*b*, 130*b*, 132*b*, 134*b*, 136*b*) is a source, and the control terminal (126*c*, 128*c*, 130*c*, 132*c*, 134*c*, 136*c*) is a gate.

The first terminal 126*a* of the fourth switch 126 is coupled to the control terminal 126*c* to form the foregoing shift input terminal 110*a*. The first terminal 128*a* of the fifth switch 128 is coupled to the second terminal 126*b* of the fourth switch 126 and the actuation capacitor 138. The second terminal 128*b* of the fifth switch 128 receives a grounding voltage VSS, and the control terminal 128*c* of the fifth switch 128 is the foregoing actuation input terminal 110*d*. The first terminal 130*a* and the control terminal 130*c* of the sixth switch 130 receive the working voltage VDD, and the second terminal 130*b* thereof is coupled to the first terminal 132*a* of the seventh switch 132; the second terminal 132*b* of the seventh switch 132 receives the grounding voltage VSS. The control terminal 132*c* of the seventh switch 132 is coupled to the second terminal 126*b* of the fourth switch 126. The first terminal 134*a* of the eighth switch 134 is the foregoing clock receiving terminal 110*e*, and receives the foregoing clock signal CK. The second terminal 134*b* of the eighth switch 134 is coupled to the first terminal 136*a* of the ninth switch 136, and the foregoing shift output terminal 110*c* is between the second terminal 134*b* of the eighth switch 134 and the first terminal 136*a* of the ninth switch 136. The second terminal 136*b* of the ninth switch 136 receives the grounding voltage VSS. The control terminal 134*c* of the eighth switch 134 is coupled to the second terminal 126*b* of the fourth switch 126, and the control terminal 136*c* of the ninth switch 136 is coupled to a second node N2. The actuation capacitor 138 is coupled between the second terminal 134*b* and the control terminal 134*c* of the eighth switch 134. That is, one terminal (a first node N1) of the actuation capacitor 138 is coupled to the second terminal 126*b* of the fourth switch 126; and the other terminal of the actuation capacitor 138 is coupled to the foregoing shift output terminal 110*c*.

Further, as shown in FIG. 3 and FIG. 5, for example, a signal action timing of the first stage's and second stage's shift registers 110 in FIG. 3 is used for description below.

At a time point t1 (a starting point of the first stage's shift register 110): in the first stage's shift register 110, the clock signal CK received by the clock receiving terminal 110*e* is at a high potential, the start signal EP received by the shift input terminal 110*a* is at a high potential, and an actuation signal I of the actuation input terminal 110*d* is at a low potential. The fourth switch 126, the sixth switch 130, the seventh switch 132, and the eighth switch 134 of the first stage's shift register 110 are turned on, and the fifth switch 128 and the ninth switch 136 are turned off. The first node N1 of the first stage's shift register 110 is at a high potential, and the second node N2 of the first stage's shift register 110 is at a low potential. A voltage outputted by the shift output terminal 110*c* is at a low potential.

At a time point t3 (a scanning generation point of the first stage's shift register 110): in the first stage's shift register 110, the clock signal CK received by the clock receiving terminal 110*e* is converted from the low potential to the high potential, the shift output terminal 110*c* of the first stage's shift register 110 outputs a high potential, that is, generates a trigger pulse wave S11. The shift input terminal 110*a* of the second stage's shift register 110 is coupled to the shift output terminal 110*c* of the first stage's shift register 110, and therefore the scanning signal S1 outputted by the shift output terminal 110*c* of the first stage's shift register 110 may be inputted to the shift input terminal 110*a* of the second stage's shift register 110, to serve as a to-be-shifted signal E of the second stage's shift register 110 (in this case, the second stage's shift register 110 enters the starting point).

At a time point t4 (a scanning end point of the first stage's shift register 110): in these shift registers 110, the clock signal CK received by the clock receiving terminal 110*e* is converted into a low potential and the trigger pulse wave S11 ends; and the actuation signal I received by the actuation input terminal 110*d* is converted into a high potential. The fourth switch 126, the seventh switch 132, and the eighth switch 134 of the first stage's shift register 110 are turned off, and the fifth switch 128, the sixth switch 130, and the ninth switch 136 thereof are turned on. Therefore, the first node N1 of the first stage's shift register 110 is at a low potential, the second node N2 thereof is at a high potential, and scanning of the first stage's shift register 110 ends; in this case, the actuation pulse wave S21 is at a high potential, the actuation output terminal 110*b* is connected to the control terminal 122*c* of the lighting unit 104, and the second switch 122 is turned on.

At a time point t5: an output of the shift output terminal 110*c* of the second stage's shift register 110 is at a high potential, and a trigger pulse wave S11 is generated (the second stage's shift register 110 enters the scanning generation point). The shift input terminal 110*a* of the third stage's shift register 110 is coupled to the shift output terminal 110*c* of the second stage's shift register 110 (referring to FIG. 2), and therefore the scanning signal S1 outputted by the shift output terminal 110*c* of the second stage's shift register may be inputted to the shift input terminal 110*a* of the third stage's shift register 110, to serve as a to-be-shifted signal E of the third stage's shift register 110 (the third stage's shift register 110 enters the starting point).

At a time point t6: the actuation input terminal 110*d* receives a second actuation signal I at a high potential. The second node N2 of the second stage's shift register 110 is converted into a high potential (scanning of the second stage's shift register 110 ends).

At a time point t7: the third stage's shift register 110 enters a scanning generation point (not shown in FIG. 3).

In this way, the number of shift registers 110 may be augmented according to the number of the lighting units 104, and each shift register 110 may use the scanning signal S1 outputted by a previous stage as a to-be-shifted signal E; and in addition, after each shift register 110 receives the scanning signal S1 outputted by the previous stage, the shift output terminal 110*c* of the shift register 110 outputs a trigger pulse wave S11, so that the brightness signal S3 charges the driving capacitor 118 to the brightness voltage.

Figure 6:
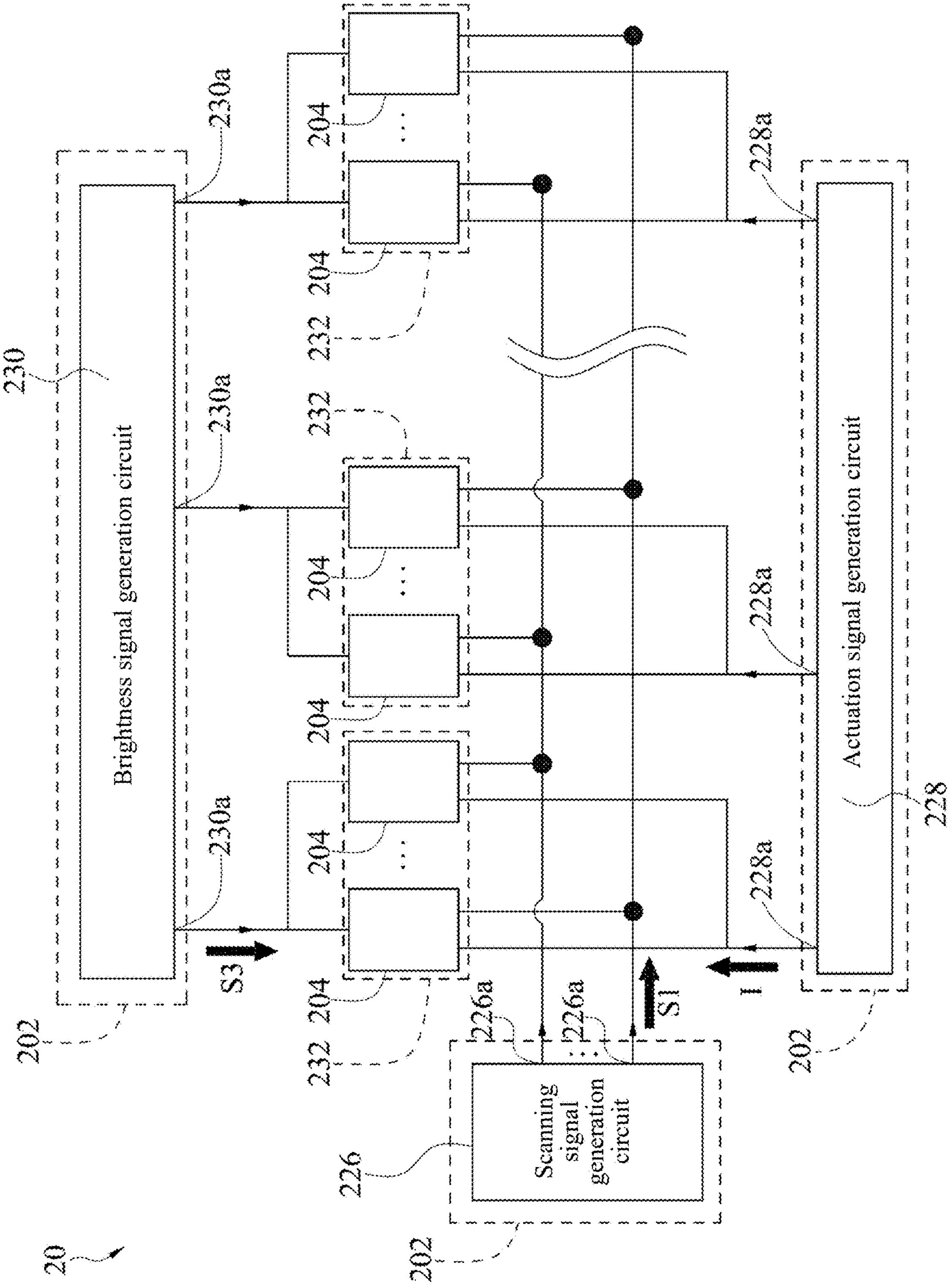
FIG. 6 is a feed line diagram of a lighting unit and illustrates a connection relationship between a control unit and the lighting unit according to a second embodiment of the present invention.
Figure 7:
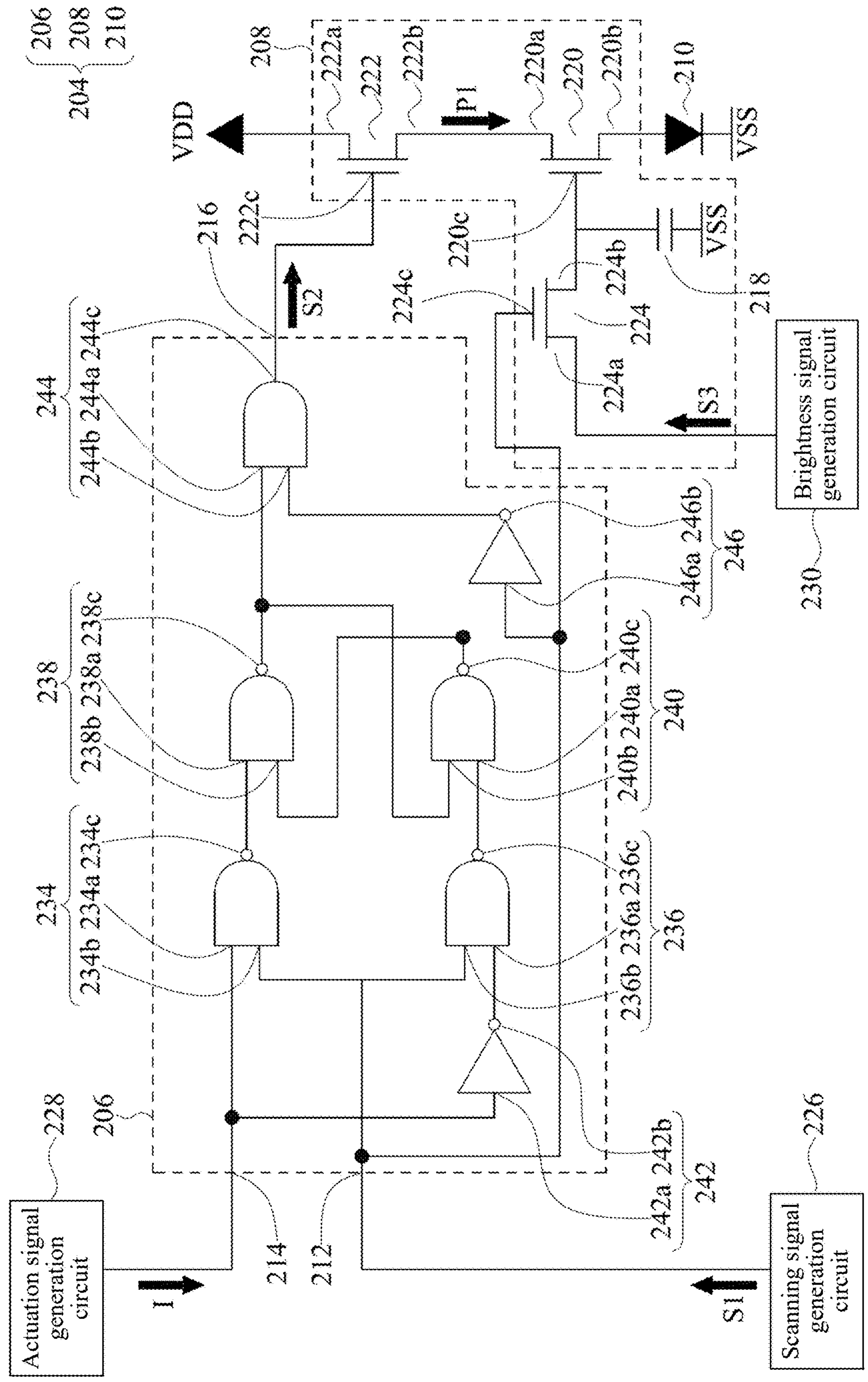
FIG. 7 is a circuit diagram of a lighting unit according to the second embodiment of the present invention.
Figure 8:
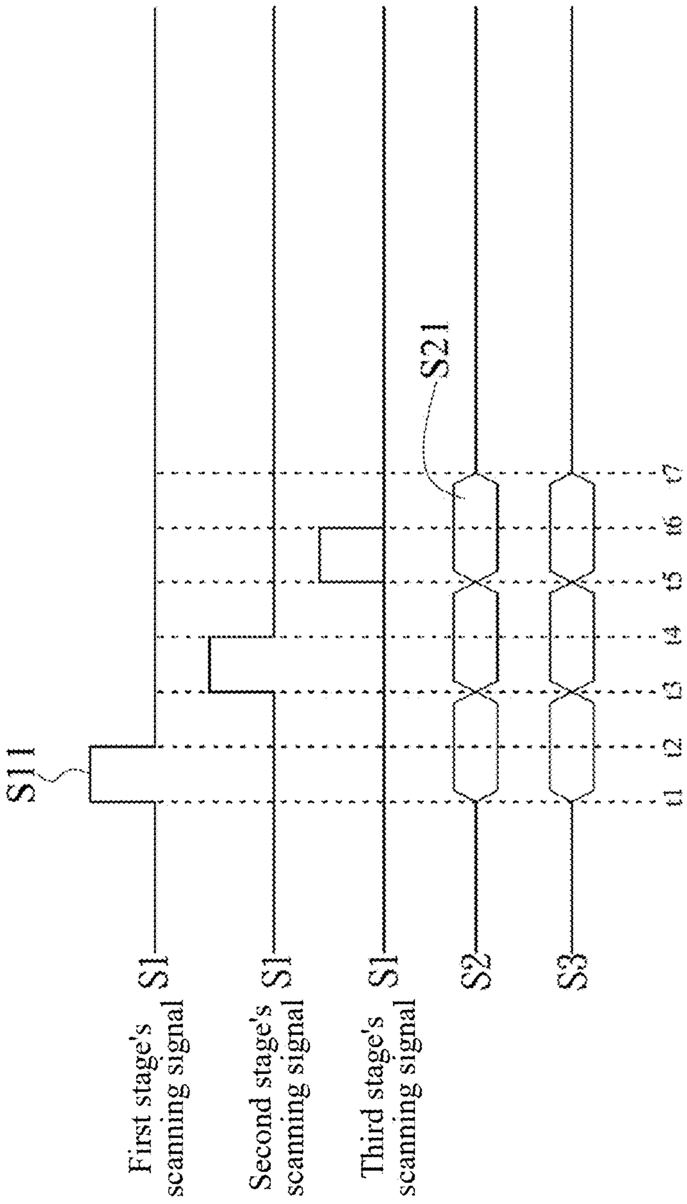
FIG. 8 is a signal timing diagram of an OLED print head according to the second embodiment of the present invention.

Refer to FIG. 6, FIG. 7, and FIG. 8. FIG. 6 is a feed line diagram of a lighting unit 204 and illustrates a connection relationship between a control unit 202 and the lighting unit 204 according to a second embodiment of the present invention. FIG. 7 is a circuit diagram of a lighting unit 204 according to the second embodiment of the present invention. FIG. 8 is a signal timing diagram of an OLED print head 20 according to the second embodiment of the present invention. The OLED print head 20 includes a control unit 202 and a plurality of lighting units 204. The control unit 202 is configured to output a plurality of scanning signals S1, an actuation signal I, and a brightness signal S3. These scanning signals S1 each has a non-synchronous trigger pulse wave S11. The plurality of lighting units 204 are coupled to the control unit 202, and each lighting unit 204 includes a synchronization circuit 206, a driving circuit 208, and an OLED 210. Each synchronization circuit 206 includes a synchronous signal input terminal 212, an actuation input terminal 214, and an actuation output terminal 216. The synchronous signal input terminals 212 of these synchronization circuits 206 respectively receive these scanning signals S1 in a one-to-one manner. These actuation input terminals 214 receive an actuation signal I. The actuation output terminal 216 of each synchronization circuit 206 outputs an actuation output signal S2 according to the trigger pulse wave S11, so that the actuation output signal S2 has an actuation pulse wave S21 corresponding to a time point of the trigger pulse wave S11.

As shown in FIG. 7, the driving circuit 208 includes a driving capacitor 218, a first switch 220, and a second switch 222. The driving circuit 208 is configured to store a brightness voltage corresponding to the brightness signal S3 in the driving capacitor 218 in response to a trigger pulse wave S11 of a scanning signal S1. The first switch 220 is controlled by the brightness voltage, and the second switch 222 is controlled by an actuation pulse wave S21 of the actuation output signal S2. The OLED 210 is coupled to the first switch 220, and the first switch 220 and the second switch 222 are located on a driving path P1 of the OLED 210. An upstream end of the driving path P1 has a working voltage VDD. When both the first switch 220 and the second switch 222 are turned on, the OLED 210 obtains a driving current related to the brightness voltage through the driving path P1, for lighting. In this way, each OLED 210 may obtain a corresponding driving current according to the brightness voltage, so as to emit light having a consistent brightness along with a change in the driving current. The first switch 220 includes a first terminal 220*a*, a second terminal 220*b*, and a control terminal 220*c*. The second switch 222 includes a first terminal 222*a*, a second terminal 222*b*, and a control terminal 222*c*.

The driving circuit 208 further includes a third switch 224. The third switch 224 includes a first terminal 224*a*, a second terminal 224*b*, and a control terminal 224*c*. The first terminal 224*a* of the third switch 224 receives the brightness signal S3. The second terminal 224*b* of the third switch 224 is coupled to the driving capacitor 218, and the control terminal 224*c* of the third switch 224 receives the scanning signal S1. An on/off state of the third switch 224 is decided by a trigger pulse wave S11 of the scanning signal S1. Here, the third switch 224 is an NMOS transistor, the first terminal 224*a* is a drain, the second terminal 224*b* is a source, and the control terminal 224*c* is a gate. It is to be noted that actions of the driving circuit 208 after receiving the actuation output signal S2, the scanning signal S1, and the brightness signal S3 in the second embodiment are the same as those in the first embodiment. The description of the first embodiment may be referred to, and details are not repeated herein again.

As shown in FIG. 6 and FIG. 7, in some embodiments, the control unit 202 includes a scanning signal generation circuit 226, an actuation signal generation circuit 228, and a brightness signal generation circuit 230. The scanning signal generation circuit 226 includes a plurality of scanning signal output terminals 226*a*. The scanning signal generation circuit 226 is configured, so that these scanning signal output terminals 226*a* output these scanning signals S1. The actuation signal generation circuit 228 includes a plurality of actuation signal output terminals 228*a*. The actuation signal generation circuit 228 is configured, so that these actuation signal output terminals 228*a* output actuation signals I. The brightness signal generation circuit 230 includes a plurality of brightness signal output terminals 230*a*. The brightness signal generation circuit 230 is configured, so that these brightness signal output terminals 230*a* output brightness signals S3.

As shown in FIG. 6, in some embodiments, these lighting units 204 are classified into a plurality of groups 232. Each scanning signal output terminal 226*a* is coupled to a lighting unit 204 having a same serial number with the scanning signal output terminal 226*a* in these groups 232. These actuation signal output terminals 228*a* are coupled to these groups 232 in a one-to-one manner and each actuation signal output terminal 228*a* is coupled to all lighting units 204 in a same group 232. These brightness signal output terminals 230*a* are coupled to these groups 232 in a one-to-one manner and each brightness signal output terminal 230*a* is coupled to all lighting units 204 in a same group 232. Therefore, all of the lighting units 204 in the same group 232 may receive the same actuation signal I. However, only one lighting unit 204 is designated (the trigger pulse wave S11 is received) in a same group 232 at a time point, only the designated lighting unit 204 performs a corresponding action according to the received actuation signal I, and the lighting units 204 that have not received the trigger pulse wave S11 do not perform a corresponding action. In addition, the brightness signal S3 outputted by each brightness signal output terminal 230*a* is independent of each other and therefore is not affected by each other. Therefore, the designated lighting unit 204 in each group 232 may be controlled according to requirements.

Further, as shown in FIG. 7, in some embodiments, the synchronization circuit 206 refers to a logic circuit, which includes a first NAND gate 234, a second NAND gate 236, a third NAND gate 238, a fourth NAND gate 240, a first NOT gate 242, an AND gate 244, and a second NOT gate 246. Specifically, the first NAND gate 234 has a first input terminal (234*a*, 234*b*) and a first output terminal 234*c*. The second NAND gate 236 has a second input terminal (236*a*, 236*b*) and a second output terminal 236*c*. The third NAND gate 238 has a third input terminal (238*a*, 238*b*) and a third output terminal 238*c*. The fourth NAND gate 240 has a fourth input terminal (240*a*, 240*b*) and a fourth output terminal 240*c*. The first NOT gate 242 has a fifth input terminal 242*a* and a fifth output terminal 242*b*. The AND gate 244 has a sixth input terminal (244*a*, 244*b*) and a sixth output terminal 244*c*. The second NOT gate 246 has a seventh input terminal 246*a* and a seventh output terminal 246*b*.

The first input terminal 234*a* of the first NAND gate 234 is coupled to the actuation signal output terminals 228*a*. The first input terminal 234*b* is coupled to the scanning signal output terminals 226*a*. The first output terminal 234*c* is coupled to the third input terminal 238*a* of the third NAND gate 238. The second input terminal 236*a* of the second NAND gate 236 is coupled to the scanning signal output terminals 226*a*. The second input terminal 236*b* of the second NAND gate 236 is coupled to the fifth output terminal 242*b* of the first NOT gate 242. The second output terminal 236*c* of the second NAND gate 236 is coupled to the fourth input terminal 240*a* of the fourth NAND gate 240. The third input terminal 238*b* of the third NAND gate 238 is coupled to the fourth output terminal 240*c* of the fourth NAND gate 240. The third output terminal 238*c* of the third NAND gate 238 is coupled to the fourth input terminal 240*b* of the fourth NAND gate 240. The fifth input terminal 242*a* of the first NOT gate 242 is coupled to the actuation signal output terminals 228*a*. The sixth input terminal 244*b* of the AND gate 244 is coupled to the seventh output terminal 246*b* of the second NOT gate 246. The sixth output terminal 244*c* of the AND gate 244 is coupled to the control terminal 222*c* of the second switch 222. The seventh input terminal 246*a* of the second NOT gate 246 is coupled to the scanning signal output terminal 226*a* and the control terminal 224*c* of the third switch 224.

In some embodiments, the first NAND gate 234, the second NAND gate 236, the third NAND gate 238, the fourth NAND gate 240, the first NOT gate 242, the AND gate 244, and the second NOT gate 246 in the synchronization circuit 206 may be implemented by TFTs, but the present invention is not limited thereto. Any circuit capable of implementing the foregoing logic element can be implemented.

In some embodiments, the foregoing transistors (the foregoing switches 220, 222, 224) are TFTs.

In this embodiment, the first NAND gate 234, the second NAND gate 236, the third NAND gate 238, the fourth NAND gate 240, and the first NOT gate 242 form a D latch. According to the above, when the scanning signal S1 triggers the trigger pulse wave S11 (that is, the scanning signal S1 is converted into a high potential), the third output terminal 238*c* of the third NAND gate 238 outputs a signal consistent with the actuation signal I by the first input terminal 234*a* of the first NAND gate 234, to the sixth input terminal 244*a* of the AND gate 244. When the scanning signal S1 is not in the trigger pulse wave S11 (that is, the scanning signal S1 is converted into a low potential), the third output terminal 238*c* of the third NAND gate 238 maintains to output the signal. In another aspect, during the trigger pulse wave S11, the control terminal 224*c* of the third switch 224 is turned on, so that the driving capacitor 218 is charged to the brightness voltage by using the brightness signal S3 received by the third switch 224 (the same as the operations in the first embodiment, which is not repeated herein). In addition, what is received by the sixth input terminal 244*b* of the AND gate 244 is the scanning signal S1 of which the state is reversed by the second NOT gate 246, so that when the trigger pulse wave S11 ends (converted from the high potential to the low potential; in this case, the third switch 224 is turned off), the sixth output terminal 244*c* of the AND gate 244 transfers the signal (that is, the actuation output signal S2 having the actuation pulse wave S21 (high potential)) by the third output terminal 238*c* of the third NAND gate 238 to the second switch 222. Therefore, a start time point of the actuation pulse wave S21 of the actuation output signal S2 received by the second switch 222 is an end time point of the trigger pulse wave S11 (the corresponding relationship shown in FIG. 3). Therefore, when the trigger pulse wave S11 ends, the second switch 222 on the driving path P1 is turned on, and whether the first switch 220 is turned on depends on the brightness voltage of the driving capacitor 218, so as to determine whether the OLED 210 emits light and the lighting brightness of the OLED 210.

Figure 9:
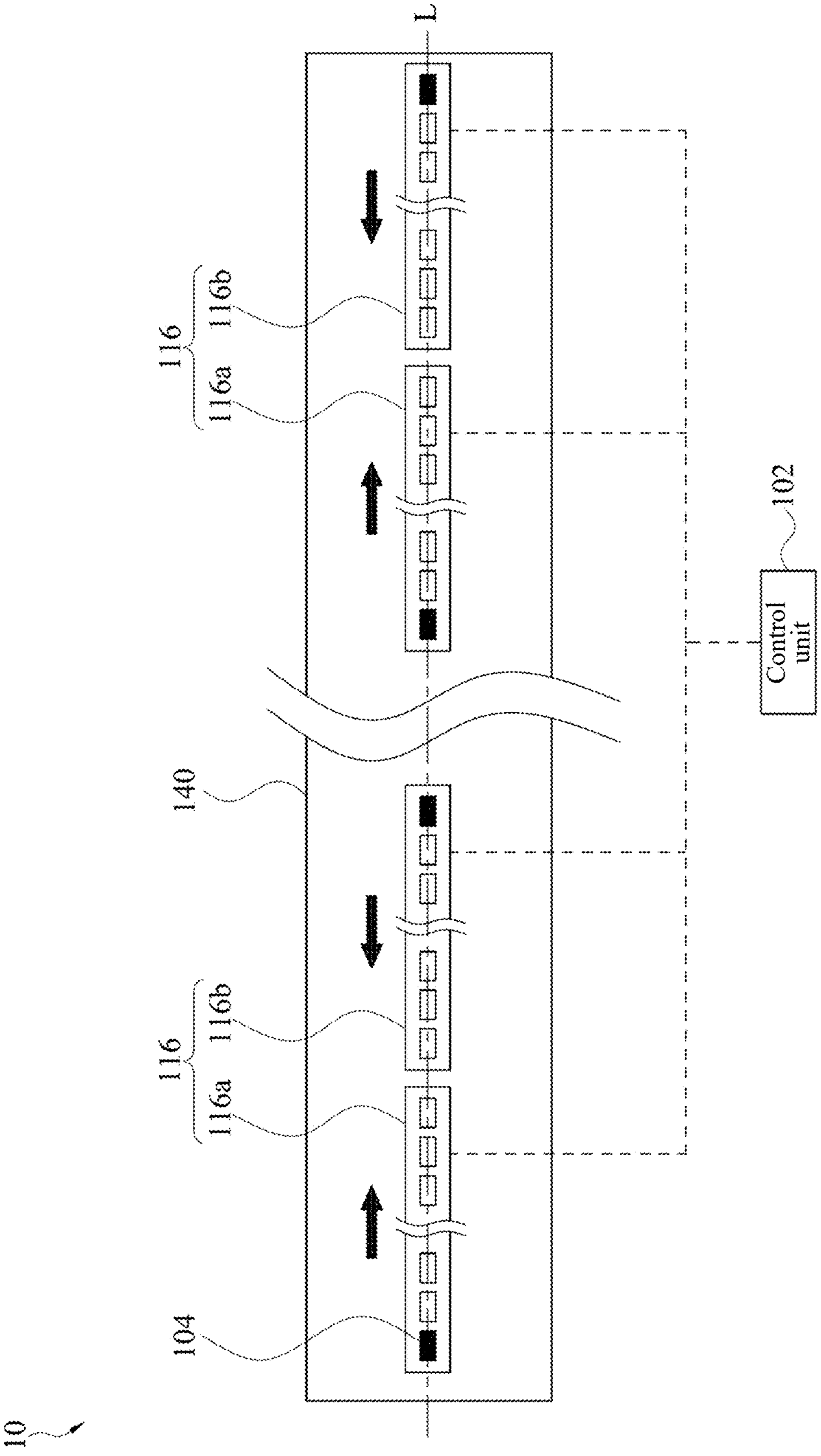
FIG. 9 is a schematic flat diagram of an OLED print head according to some embodiments of the present invention.

Refer to both FIG. 7 and FIG. 8. The first stage's lighting unit 204 receives the actuation output signal S2, the brightness signal S3, and the first stage's scanning signal S1 transferred by the control unit 202. At the time point t2, the first stage's lighting unit 204 is designated to operate, so as to determine whether the OLED 210 emits light and the lighting brightness of the OLED 210 according to the brightness voltage corresponding brightness signal S3 and for charging the driving capacitor 218. Similarly, at the respective time points t4 and t6, the second stage's and third stage's lighting units 204 are respectively designated to operate, and so on. Referring to FIG. 9, FIG. 9 is a schematic flat diagram of an OLED print head 10 according to some embodiments of the present invention. In some embodiments, these lighting units 104 are configured on a substrate 140 and distributed in a line. These lighting units 104 are classified into a plurality of groups 116. The groups 116 each includes a plurality of first groups 116*a* and a plurality of second groups 116*b*. Each group 116 is located on a section of an axial line L of the substrate 140. These groups (116*a*, 116*b*) are arranged alternately and these lighting units 104 of the groups are turned on in a first lighting order (the arrow direction in FIG. 9 is from the left to the right) and a second lighting order (the arrow direction in FIG. 9 is from the right to the left) which is reverse to the first lighting order. In other words, the first group 116*a* and the second group 116*b* are alternately arranged, respectively (for example, the first group 116*a* is at an odd serial number and the second group 116*b* is at an even serial number; and vice versa); in the first group 116*a*, the lighting units 104 are turned on in an order according to the first lighting order; and in the second group 116*b*, the lighting units 104 are turned on in an order according to the second lighting order. In this way, compared with the same direction lighting mode, it is not apt to produce the feelings of segment difference for each print row. It should be noted that, although the symbols of the lighting unit 104 is denoted by the first embodiment, the arrangement is also applicable to the second embodiment.

In some embodiments, the lighting units 104 and 204 are manufactured by using the conductive TFT technology. That is, the OLEDs 114 and 210 and the driving circuits 112 and 208 are made of transparent conductive TFTs such as indium tin oxide (ITO) and indium zinc oxide (IZO), and are packaged on the substrate 140 (for example, a glass substrate). Therefore, the plurality of lighting units 104 and 204 can be formed on the substrate 140 according to a predetermined layout manner without the need for wafer dicing, die bonding, and other steps. In addition, the conductive thin film may alternatively form a wire, by which a wire bonding step can be omitted. In some embodiments, the shift register 110 is manufactured by using the conductive thin film technology, and is packaged on the same substrate 140 together with the lighting units 104. The foregoing transistors are TFTs. The OLEDs 114 and 210 may be active matrix OLEDs (AMOLEDs), so that the OLEDs 114 and 210 have the advantages of small size, self-luminescence, and fast reaction speed.

In some embodiments, the control units 102 and 202 are control circuits capable of outputting the foregoing timing signals, such as a microprocessor, a digital signal processor (DSP), and an application specific integrated circuit (ASIC).

To sum up, according to the OLED print head (10, 20) of some embodiments, by directly manufacturing the lighting unit (104, 204) formed of a conductive TFT, an OLED (114, 210), and a driving circuit (112, 208) on the substrate 140, the manufacturing steps can be simplified. In another aspect, the driving capacitor (118, 218) of the lighting unit (104, 204) stores a brightness voltage corresponding to the brightness signal S3, so that the voltage is not discharged to a low potential (that is, a discharging change of the driving capacitor (118, 218) is limited), thereby accelerating a response time for lighting of the lighting unit (104, 204) (under a brightness signal S3 having a relatively short period of time, the lighting unit (104, 204) may quickly perform successive actions such as lighting and extinguishing), guaranteeing that a change in the brightness voltage does not fluctuate excessively large, and protecting the element from being damaged to prolong the service life.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An organic light-emitting diode (OLED) print head, comprising:

a control unit, configured to output a start signal and a brightness signal; and a plurality of lighting units, coupled to the control unit, each lighting unit comprising:

a shift register, each shift register comprising a shift input terminal, an actuation output terminal, and a shift output terminal, and the shift registers being connected in series so that a shift output terminal of a previous stage's shift register is coupled to a shift input terminal of a subsequent stage's shift register, wherein a shift input terminal of a first stage's shift register receives and shifts the start signal, so as to output a scanning signal having a trigger pulse wave through the shift output terminal, and the other shift registers each receives and shifts the scanning signal outputted by the shift output terminal of the previous stage's shift register, so as to output the scanning signal having the trigger pulse wave through the shift output terminal, the actuation output terminal of each shift register outputs an actuation output signal, and the actuation output signal has an actuation pulse wave corresponding to a time point of the trigger pulse wave;

a driving circuit, comprising a driving capacitor, a first switch, and a second switch, and configured to store a brightness voltage corresponding to the brightness signal in the driving capacitor in response to the trigger pulse wave of the scanning signal, wherein the first switch is controlled by the brightness voltage, and the second switch is controlled by the actuation output signal; and an OLED, coupled to the first switch, wherein the first switch and the second switch are located on a driving path of the OLED, an upstream end of the driving path has a working voltage, and the OLED obtains, via the driving path, a driving current related to the brightness voltage when both the first switch and the second switch are turned on.

2. The OLED print head according to claim 1, wherein the driving circuit further comprises a third switch, the first switch, the second switch, and the third switch each comprises a first terminal, a second terminal, and a control terminal, the first terminal of the third switch receives the brightness signal, the control terminal of the third switch receives the scanning signal, the second terminal of the third switch is coupled to the driving capacitor, and the third switch is turned on in response to the trigger pulse wave of the scanning signal, so that the driving capacitor receives the brightness signal and is charged to the brightness voltage.

3. The OLED print head according to claim 2, wherein the control terminal of the first switch is coupled to the driving capacitor, and the first switch is turned on or off in response to the brightness voltage.

4. The OLED print head according to claim 3, wherein the first terminal of the second switch receives the working voltage, the second terminal of the second switch is coupled to the first terminal of the first switch, the control terminal of the second switch receives the actuation output signal, and the second switch is turned on in response to the actuation pulse wave of the actuation output signal.

5. The OLED print head according to claim 4, wherein an end time point of the trigger pulse wave of the scanning signal is the same as a start time point of the actuation pulse wave of the actuation output signal.

6. The OLED print head according to claim 1, wherein the second switch, the first switch, and the OLED are sequentially coupled along a flowing direction of the driving current.

7. The OLED print head according to claim 1, wherein the control unit comprises:

a brightness signal generation circuit, comprising a plurality of brightness signal output terminals, the brightness signal output terminals being configured to output the brightness signal, wherein the lighting units are classified into a plurality of groups, the brightness signal output terminals are respectively coupled to the groups in a one-to-one manner, and each brightness signal output terminal is coupled to all lighting units in a same group.

8. The OLED print head according to claim 1, wherein the lighting units are configured to be distributed in a line, the lighting units are classified into a plurality of groups, each group is located in a section of the line, the groups are arranged alternately, and the lighting units are turned on in a first lighting order and in a second lighting order, separately, wherein the first lighting order is reverse to the second lighting order.

9. An organic light-emitting diode (OLED) print head, comprising:

a control unit, configured to output a plurality of scanning signals, an actuation signal, and a brightness signal, wherein the scanning signals each has a non-synchronous trigger pulse wave; and a plurality of lighting units, coupled to the control unit, each lighting unit comprising:

a synchronization circuit, wherein each synchronization circuit comprises a synchronous signal input terminal, an actuation input terminal, and an actuation output terminal, wherein the synchronous signal input terminals of the synchronization circuits respectively receive the scanning signals in a one-to-one manner, the actuation input terminals of the synchronization circuits receive the actuation signal, and the actuation output terminal of each synchronization circuit outputs an actuation output signal according to the trigger pulse wave, so that the actuation output signal has an actuation pulse wave corresponding to a time point of the trigger pulse wave;

a driving circuit, comprising a driving capacitor, a first switch, and a second switch, and configured to store a brightness voltage corresponding to the brightness signal in the driving capacitor in response to the trigger pulse wave of the scanning signal, wherein the first switch is controlled by the brightness voltage, and the second switch is controlled by the actuation output signal; and an OLED, coupled to the first switch, wherein the first switch and the second switch are located on a driving path of the OLED, an upstream end of the driving path has a working voltage, and the OLED obtains, via the driving path, a driving current related to the brightness voltage when both the first switch and the second switch are turned on.

10. The OLED print head according to claim 9, wherein the driving circuit further comprises a third switch, the first switch, the second switch, and the third switch each comprises a first terminal, a second terminal, and a control terminal, the first terminal of the third switch receives the brightness signal, the control terminal of the third switch receives the scanning signal, the second terminal of the third switch is coupled to the driving capacitor, and the third switch is turned on in response to the trigger pulse wave of the scanning signal, so that the driving capacitor receives the brightness signal and is charged to the brightness voltage.

11. The OLED print head according to claim 10, wherein the control terminal of the first switch is coupled to the driving capacitor, and the first switch is turned on or off in response to the brightness voltage.

12. The OLED print head according to claim 11, wherein the first terminal of the second switch receives the working voltage, the second terminal of the second switch is coupled to the first terminal of the first switch, the control terminal of the second switch receives the actuation output signal, and the second switch is turned on in response to the actuation pulse wave of the actuation output signal.

13. The OLED print head according to claim 12, wherein an end time point of the trigger pulse wave of the scanning signal is the same as a start time point of the actuation pulse wave of the actuation output signal.

14. The OLED print head according to claim 9, wherein the second switch, the first switch, and the OLED are sequentially coupled along a flowing direction of the driving current.

15. The OLED print head according to claim 9, wherein the control unit comprises:

a brightness signal generation circuit, comprising a plurality of brightness signal output terminals, the brightness signal output terminals being configured to output the brightness signal, wherein the lighting units are classified into a plurality of groups, the brightness signal output terminals are respectively coupled to the groups in a one-to-one manner, and each brightness signal output terminal is coupled to all lighting units in a same group.

16. The OLED print head according to claim 9, wherein the lighting units are configured to be distributed in a line, the lighting units are classified into a plurality of groups, each group is located in a section of the line, the groups are arranged alternately, and the lighting units are turned on in a first lighting order and in a second lighting order, separately, wherein the first lighting order is reverse to the second lighting order.

* * * * *